United States Patent
McNamara et al.

(10) Patent No.: US 10,926,857 B2
(45) Date of Patent: Feb. 23, 2021

(54) PRESSURIZED BULKHEAD

(71) Applicant: THE BOEING COMPANY, Chicago, IL (US)

(72) Inventors: Kyle L. McNamara, Gibbstown, NJ (US); Edward Frederick Lauser, Jr., Ridley Park, PA (US); David William Bowen, Deptford, NJ (US); Kevin Andrew Crow, Philadelphia, PA (US); Michael Stephen Niezgoda, Sewell, NJ (US)

(73) Assignee: THE BOEING COMPANY, Chicago, IL (US)

( * ) Notice: Subject to any disclaimer, the term of this patent is extended or adjusted under 35 U.S.C. 154(b) by 757 days.

(21) Appl. No.: 15/185,159

(22) Filed: Jun. 17, 2016

(65) Prior Publication Data
US 2017/0361915 A1    Dec. 21, 2017

(51) Int. Cl.
*B64C 1/10* (2006.01)
*B64C 1/06* (2006.01)

(52) U.S. Cl.
CPC .............. *B64C 1/10* (2013.01); *B64C 1/069* (2013.01)

(58) Field of Classification Search
CPC ........... B64C 1/10; B64C 1/069; B64C 1/064; B64C 7/00; B64C 2001/0072; B64C 2001/0045; B64C 2001/0081
See application file for complete search history.

(56) References Cited

U.S. PATENT DOCUMENTS

| | | | |
|---|---|---|---|
| 5,262,220 A | 11/1993 | Spriggs et al. | |
| 5,899,412 A | 5/1999 | Dilorio et al. | |
| 6,213,428 B1 | 4/2001 | Chaumel et al. | |
| 6,378,805 B1 | 4/2002 | Stephan et al. | |
| 6,443,392 B2 | 9/2002 | Weber et al. | |
| 6,478,254 B2 * | 11/2002 | Matsui | B64C 1/10 244/119 |
| 8,033,503 B2 | 10/2011 | Basso | |

(Continued)

FOREIGN PATENT DOCUMENTS

| | | |
|---|---|---|
| DE | 102010018933 A1 | 11/2011 |
| EP | 2824031 A2 | 1/2015 |
| JP | S62203899 A | 9/1987 |

OTHER PUBLICATIONS

European Extended Search Report for EP Application No. 17159578.8 dated Oct. 5, 2017.

(Continued)

*Primary Examiner* — Medhat Badawi
*Assistant Examiner* — Vicente Rodriguez
(74) *Attorney, Agent, or Firm* — Marshall, Gerstein & Borun LLP (57) ABSTRACT

A pressure bulkhead for an aircraft includes a wall assembly. The wall assembly includes a first wall section which extends in a direction nonparallel to a length of the aircraft. The wall assembly further includes a second wall section secured to the first wall section wherein the second wall section includes a curved shape. The curved shape includes a convex portion which extends further along the length of the aircraft in a direction toward the aft end of the aircraft than the first wall section. A method for assembling a pressure bulkhead is also provided.

20 Claims, 9 Drawing Sheets

(56) References Cited

U.S. PATENT DOCUMENTS

| | | | | |
|---|---|---|---|---|
| 8,444,089 B2* | 5/2013 | Mischereit | ................ | B64C 1/10 |
| | | | | 244/118.5 |
| 8,596,578 B2 | 12/2013 | Noebel et al. | | |
| 10,259,557 B2* | 4/2019 | Jorn | .......................... | B64C 1/10 |
| 2009/0242701 A1* | 10/2009 | Kondo | ...................... | B64C 1/10 |
| | | | | 244/121 |
| 2011/0233334 A1* | 9/2011 | Stephan | .................... | B64C 1/10 |
| | | | | 244/119 |
| 2011/0290940 A1* | 12/2011 | Noebel | ..................... | B64C 1/10 |
| | | | | 244/121 |
| 2013/0266770 A1* | 10/2013 | Otto | ................... | B32B 37/1284 |
| | | | | 428/172 |
| 2016/0185439 A1* | 6/2016 | Martino Gonzalez | .... | B64C 1/16 |
| | | | | 244/35 R |

OTHER PUBLICATIONS

Canadian Office Action for CA Application No. 2,962,541 dated Apr. 24, 2020.

\* cited by examiner

PRESSURIZED BULKHEAD

FIELD

The present invention relates to a pressure bulkhead for an aircraft and more particularly to a pressure bulkhead with structural support.

BACKGROUND

Pressure bulkheads for aircraft, particularly an aft pressure bulkhead is typically domed shaped. The domed shape has the ability to distribute loads exerted on the domed shaped structure as a membrane load effectively to the fuselage structure. However, a drawback of this domed or semi-spherical shaped bulkhead is that it is difficult to route systems through the bulkhead with the bulkhead having a curved shape. Routing systems through a domed shaped bulkhead include increased design complexities since additional structure is needed to provide flat surfaces for system attachment. A flatter bulkhead provides more simple interfaces for aircraft systems such as electrical, hydraulic and fuel, as well as, other systems within an aircraft. Moreover, because of the longitudinally extending nature of the domed shaped bulkhead which extends in a direction along the length of the fuselage, the domed shape competes with usable cabin space within the fuselage providing an inefficient occupation of space within the fuselage.

In contrast, pressure bulkheads for aircraft have also been constructed to have a flatter shape. A bulkhead with a flatter construction is more spatially efficient within the fuselage. However, this flatter shape typically results in the bulkhead being heavier in weight than a domed shaped bulkhead which, in contrast, more efficiently distributes loads. Additionally, the flatter pressurize bulkhead construction requires a more complex support structure to resist shear and bending loads occurring from fuselage pressurization being exerted across a flatter surface. This is in contrast to the domed shaped bulkhead construction which more efficiently distributes load with improved load path or membrane load distribution.

SUMMARY

An example of a pressure bulkhead for an aircraft includes a pressure bulkhead which includes a wall assembly. The wall assembly includes a first wall section which extends in a direction nonparallel to a length of the aircraft. The wall assembly further includes a second wall section secured to the first wall section wherein the second wall section includes a curved shape such that the curved shape includes a convex portion which extends further along the length of the aircraft in a direction toward the aft end of the aircraft than the first wall section.

An example of a method for assembling a pressure bulkhead includes the step of positioning a first wall section and a second wall section adjacent to one another. The method further includes the step of securing the first wall section to the second wall section, wherein the second wall section includes a curved shape with a convex portion which extends further along a length of the aircraft in a direction toward an aft end of the aircraft than the first wall section, forming a splice joint between the first and second wall sections and forming a wall assembly.

The features, functions, and advantages that have been discussed can be achieved independently in various embodiments or may be combined in yet other embodiments further details of which can be seen with reference to the following description and drawings.

DESCRIPTION

A pressure bulkhead of an aircraft, such as that of an aft pressure bulkhead, has certain demands placed on that structure depending on the configuration of the bulkhead. For example, a domed shaped bulkhead has load distribution benefits and lighter structural weight than a flatter configured bulkhead. On the other hand, a flatter configuration of a pressurized bulkhead often requires heavier construction and more complex support systems, yet permits easier pass through of aircraft systems through the bulkhead structure. The apparatus and method to be described herein advantageously utilizes the benefits of these different bulkhead constructions.

Figure 1:
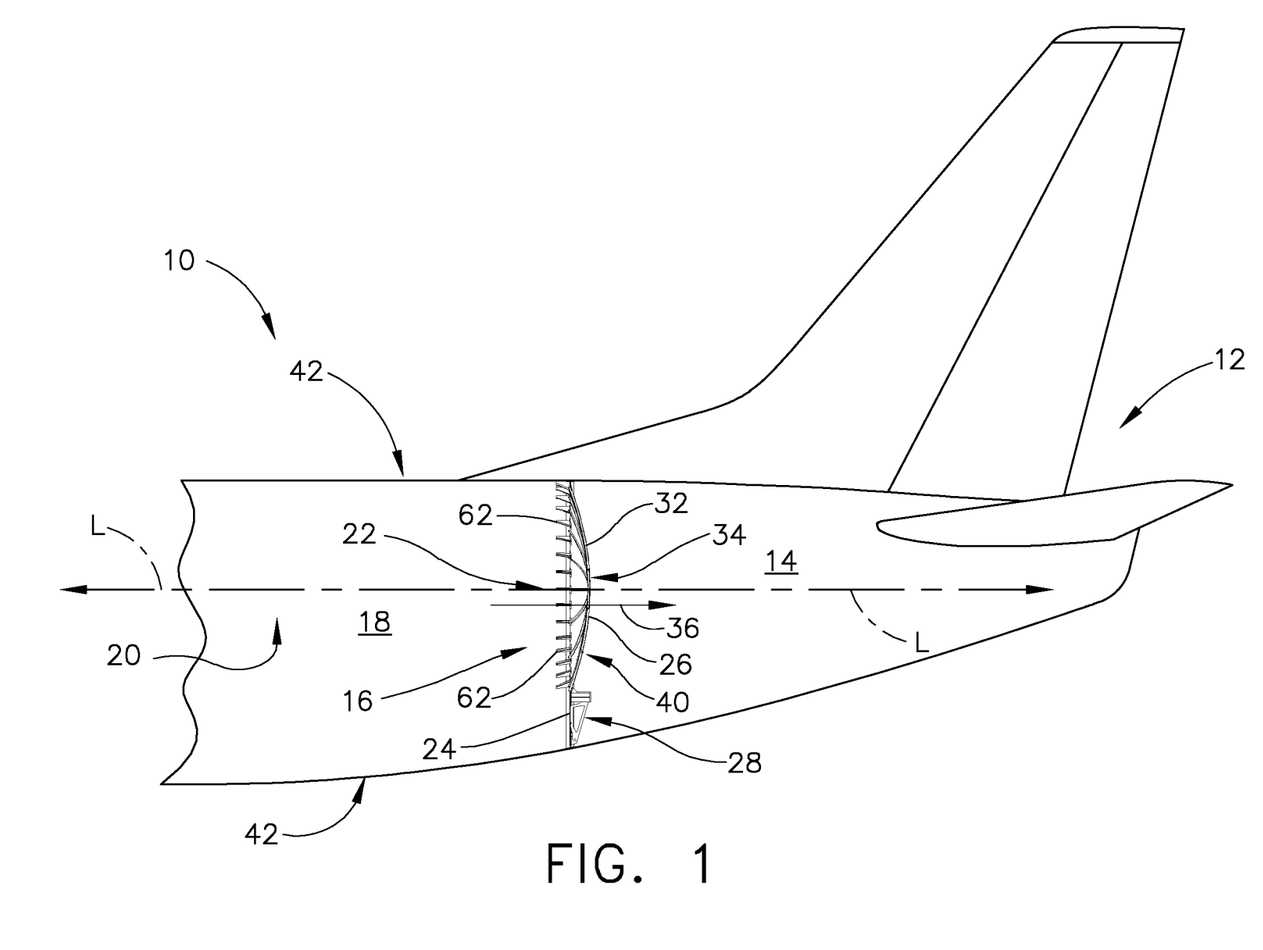
FIG. 1 is a partial cut away side plan view of an aft portion of an aircraft with bulkhead in cross section.

In referring to FIG. 1, aircraft 10 includes tail section 12 which is positioned in aft end or side 14 of aircraft 10. Pressure bulkhead 16 is positioned within aircraft 10 to provide a sealed separation of aft or unpressurized side 14 of aircraft 10 from forward or pressurized side 18 which includes cabin 20 of aircraft 10. As aircraft 10 gains altitude, aircraft 10 pressurizes cabin 20 to provide the passengers within cabin 20 a more habitable and comfortable environment. During the pressurization process force is applied against bulkhead 16 from within cabin 20 in a direction toward aft side 14 of aircraft 10 and at the time of this pressurization, the aft side 14 experiences a reduction in air pressure as a result of aft side 14 not being pressure sealed to the outside environment of aircraft 10. When aircraft 10 descends in altitude, the aft side 14 of aircraft 10 increases in pressure and the cabin 20 pressure on the forward side 18 is normalized to be comparable to the air pressure of the altitude at which the aircraft 10 lands.

Pressure bulkhead 16 includes wall assembly 22 which includes first wall section 24 and second wall section 26 which will be discussed in more detail herein. Bulkhead support assembly 28 as will also be discussed in more detail herein provides support to bulkhead 16 wall assembly 22 particularly during the pressurization of cabin 20.

Figure 2:
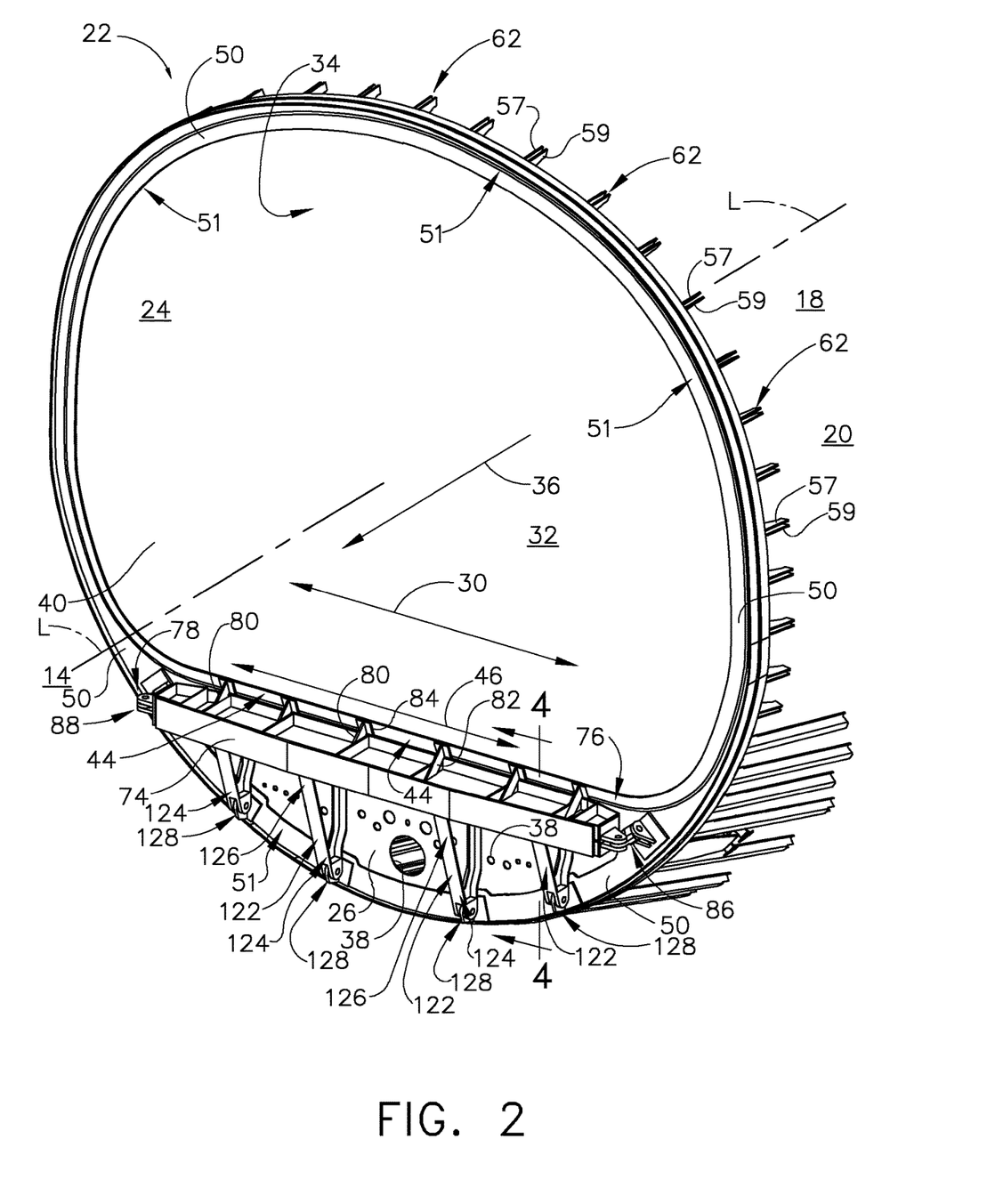
FIG. 2 is a perspective aft side view of the bulkhead wall assembly shown in FIG. 1 along with stringers extending toward the forward side of aircraft.
Figure 3:
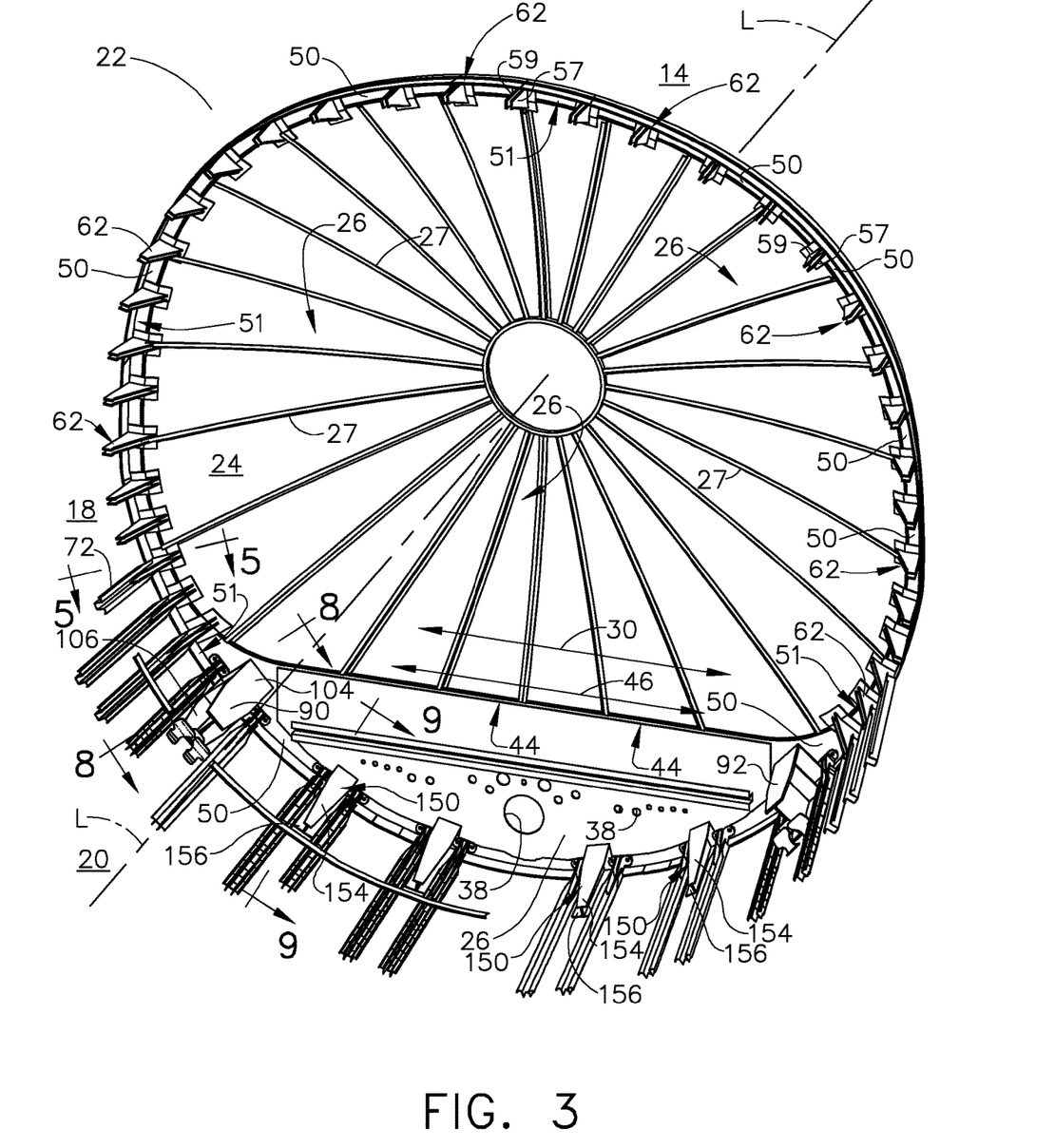
FIG. 3 is a perspective forward side view of the bulkhead wall assembly of FIG. 2.

First wall section 24, as seen in FIGS. 1-3, extends in direction 30 nonparallel to a length L of the aircraft 10. In this embodiment, first wall section 24 extends in generally a transverse direction 30 relative to length L of aircraft 10. Second wall section 26 is secured to first wall section 24. Second wall section 26 includes curved shape 32, as seen in FIG. 1, such that curved shape 32 includes a convex portion 34 which extends further along length L of aircraft 10 in direction 36 toward the aft end 14 of aircraft 10 than first wall section 24. First wall section 24 is constructed to have a relatively flat configuration or to have some curvature or contour as needed. However, first wall section 24 has a flatter configuration than the configuration of second wall section 26. This flatter configuration of first section wall section 24 than the configuration of second wall section 26 provides first wall section 24 a more efficient configuration for passing systems such as electrical, hydraulic and fuel, as well as, other systems through bulkhead 16 through openings 38 as seen in FIGS. 2 and 3 defined in first wall section 24.

Second wall section 26 takes on curved shape 32 and in this embodiment a domed shape 40, as seen in FIG. 1. Domed shape 40 of second wall section 26 provides the benefit of efficient membrane load distribution of loads to fuselage 42 of aircraft 10. The loads experienced by bulkhead 16 occur particularly as aircraft 10 gains altitude with the pressurization process of forward side 18 of bulkhead 16 which includes cabin 20 and the lowering of pressure on the aft side 14 of bulkhead 16. Domed-shape 40 configuration of second wall section 26 requires less weight for second wall structure 26 than the flatter configuration of second wall section 26 and reduces the need for more complex support structures for supporting second wall section 26 than flatter configurations would require.

Figure 4:
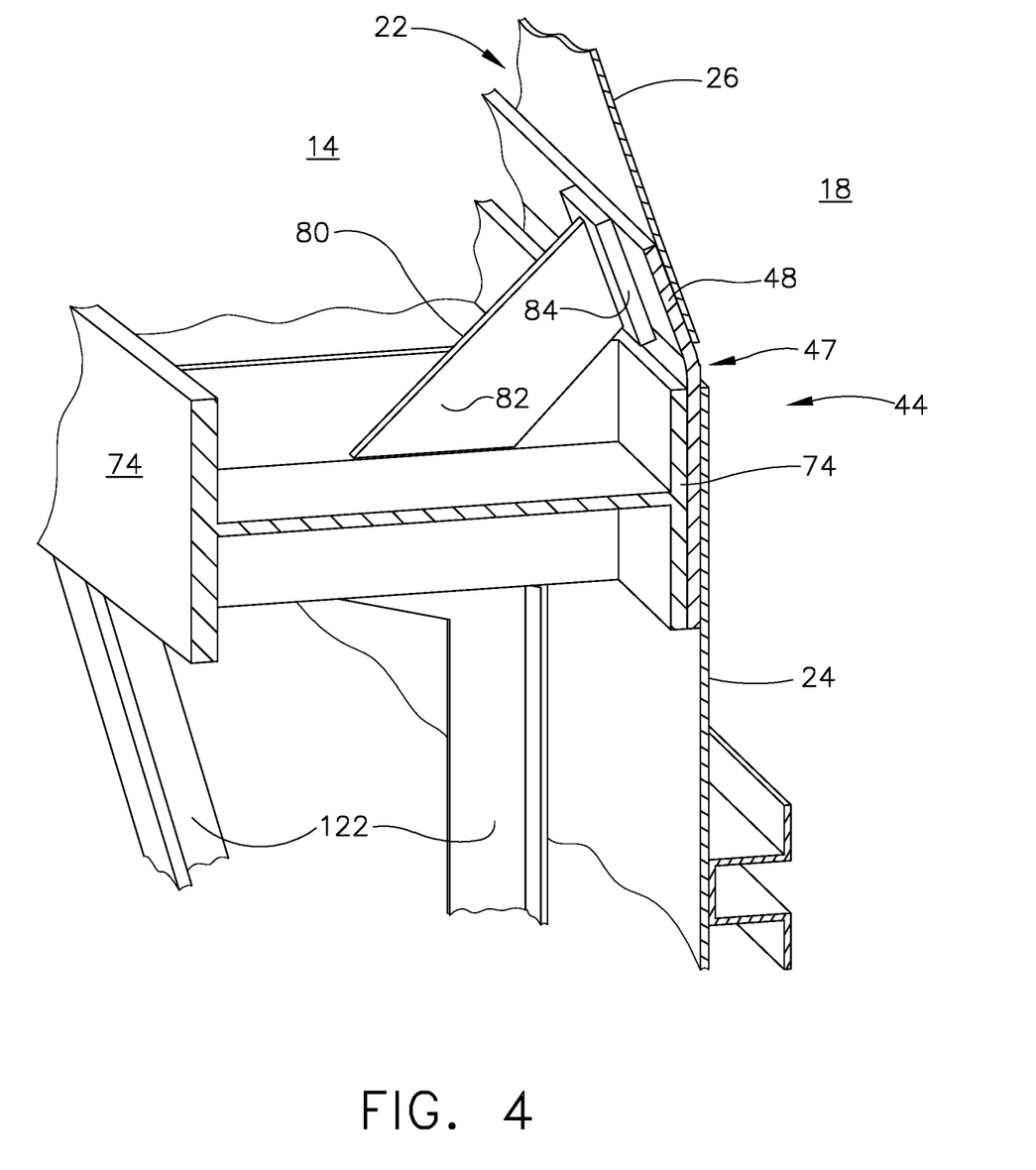
FIG. 4 is a cross section view of a splice joint as seen along line 4-4 of FIG. 2.

As can be seen in FIGS. 2 and 3, second wall section 26 extends in a direction away from first wall section 24 such that first and second wall sections 24, 26 extend within the inner dimensions of fuselage 42 to establish a pressured sealed connection with fuselage 42. First and second wall sections 24, 26 are secured together along splice joint 44 which extends across wall assembly 22 in a direction 46 nonparallel to length L of aircraft 10. Splice joint 44, as seen in FIG. 4, includes first wall section 24 and second wall section 26 positioned spaced apart from one another along splice joint 44 forming gap 47 between first and second wall members 24, 26. Splice plate 48 is positioned to abut first and second wall members 24 and 26 and to span gap 47. Splice member 47 is riveted to, otherwise secured as mentioned for other securements of members herein, first and second wall members 24 and 26 providing a pressurized sealed connection of first and second wall members 24 and 26 along splice joint 44.

Figure 5:
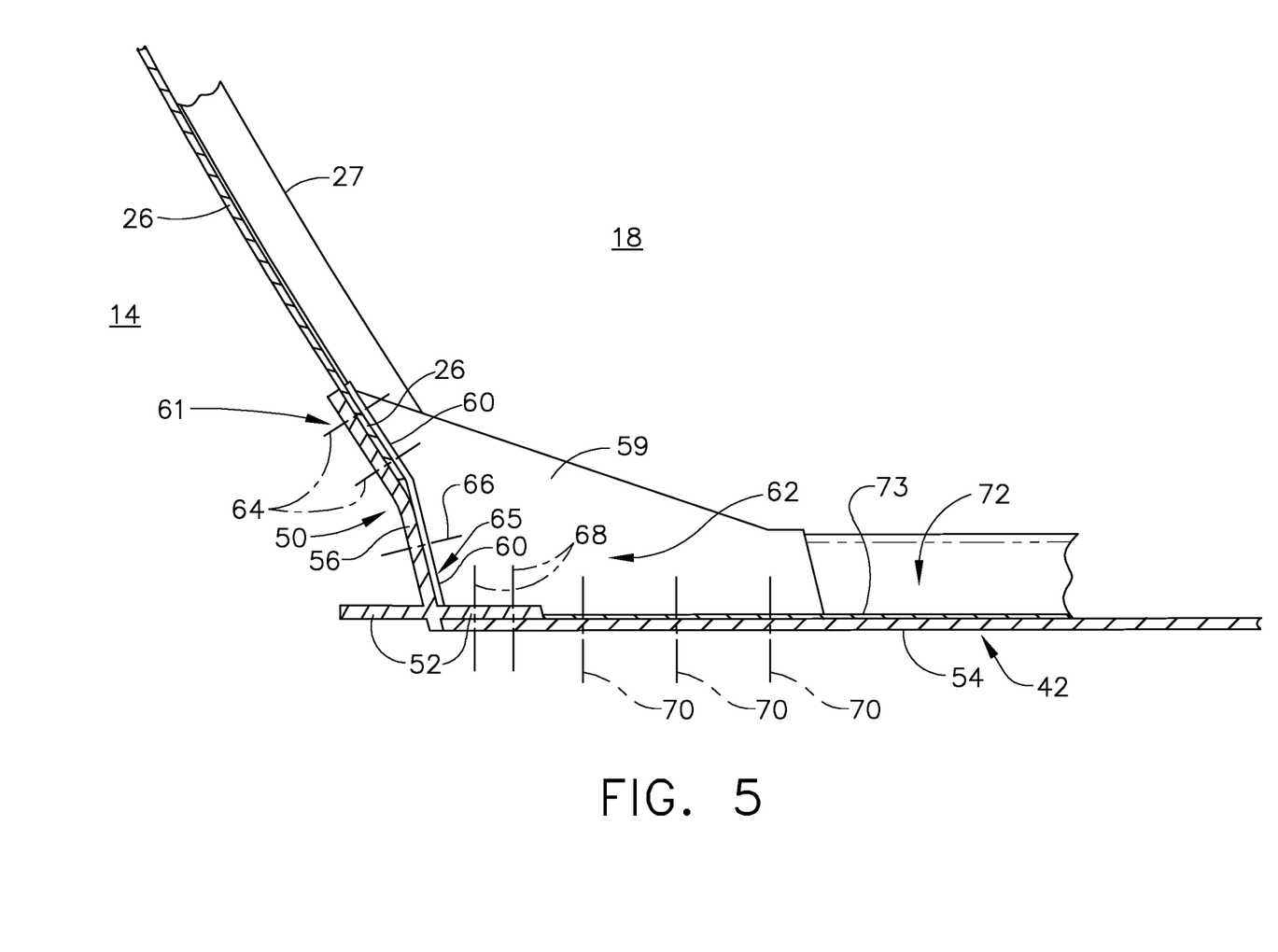
FIG. 5 is a cross section view as seen along line 5-5 in FIG. 3 of clip securement of second wall section extending on forward side of wall assembly of bulkhead.

Pressure bulkhead 16 further includes chord structure 50, as seen in FIGS. 2 and 3. Chord structure 50 extends about perimeter 51 of first and second wall sections 24, 26 of wall assembly 22. Chord structure 50, as seen in FIG. 5 has a generally "T" shaped cross section configuration as chord structure extends about perimeter 51 with cross member 52 extending along and above skin 54 of fuselage 42. Stem member 56 extends away cross member 52 in a direction away from cross member 52. As discussed in more detail herein, chord structure 50 facilitates a sealed connection between wall assembly 22 and fuselage 42. Second wall section 26 of wall assembly 22, in this embodiment, includes reinforcement rib support members 27, as seen in FIGS. 3 and 5, which extend in a radial direction of domed shape 40 and provides structural support for wall section 26 and assistance in membrane load distribution.

On forward side 18 of stem member 56, base 60 of dome securement gusset 62 extends from a top of stem member 56 to cross member 52 of chord structure 50, as seen in FIG. 5. As seen in FIGS. 2 and 3, dome securement gusset 62 includes two spaced apart plates 57 and 59 which are positioned within stringer 72 to extend along on base 73 of stringer 72, as seen in FIGS. 3 and 5, wherein stringer 72 takes on a general trough-like configuration in this embodiment. Thus, as seen in the view of FIG. 5, plate 59 is shown of dome securement gusset 62. Securement of plate 57, not shown, in this view, is similar to that described herein for plate 59.

At upper portion 61 of stem member 56, base 60 and stem member 56 sandwich a portion of second wall member 26. At upper portion 61 of stem member 56, stem member 56, second wall member 26, base 60 and plate 59 are secured together with schematically shown rivets 64. It should be understood that in referring to rivets as the manner of securement of members together in this embodiment, other types of securement can be employed for securing members such as with the use of bolts, welding or other known securements. At lower portion 65 of stem member 56, base 60 of dome securement gusset 62 are positioned abutting to one another and stem member 56, base 60 and plate 59 are secured together with schematically shown rivets 66 in this embodiment as well.

On forward side 18 of stem member 56 of chord structure 50, plate 59 of dome securement gusset 62 is secured to skin 54, with cross member 52 sandwiched between skin 54 and plate 59, with schematically shown rivets 68. Extending further in the direction of forward side 18 into cabin 20, plate 59 of dome securement gusset 62 extends beyond cross member 52 of chord structure 50. Plate 59 is secured to skin 54 through base 73 of stringer 72 with schematically shown rivets 70. As a result of these riveted connections of this embodiment, membrane loads originating from second wall section 26 are transferred to skin 54 of fuselage 42.

Figure 6:
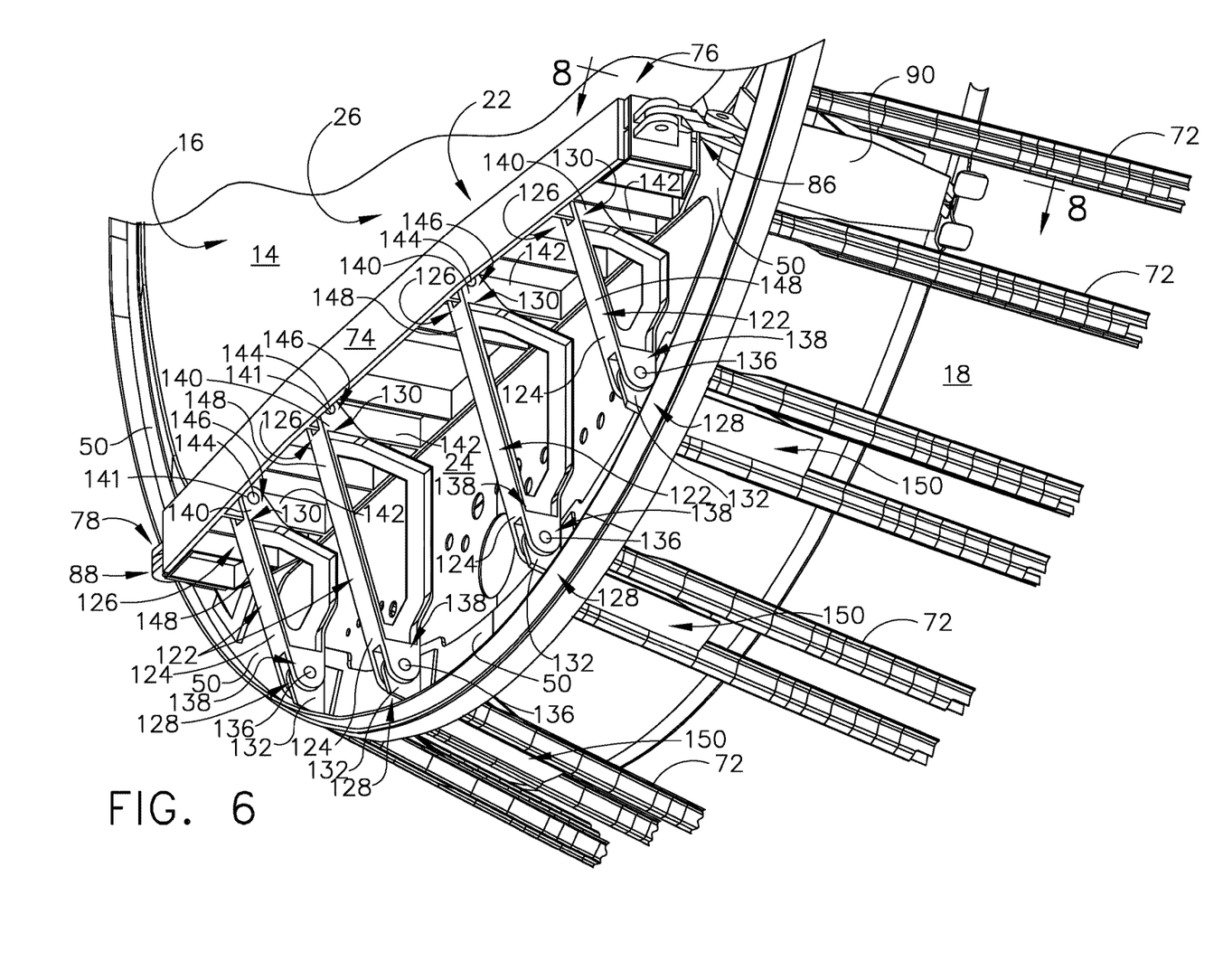
FIG. 6 is a partial cut away enlarged bottom perspective view of the aft side of the wall assembly of the bulkhead of FIG. 2.
Figure 7:
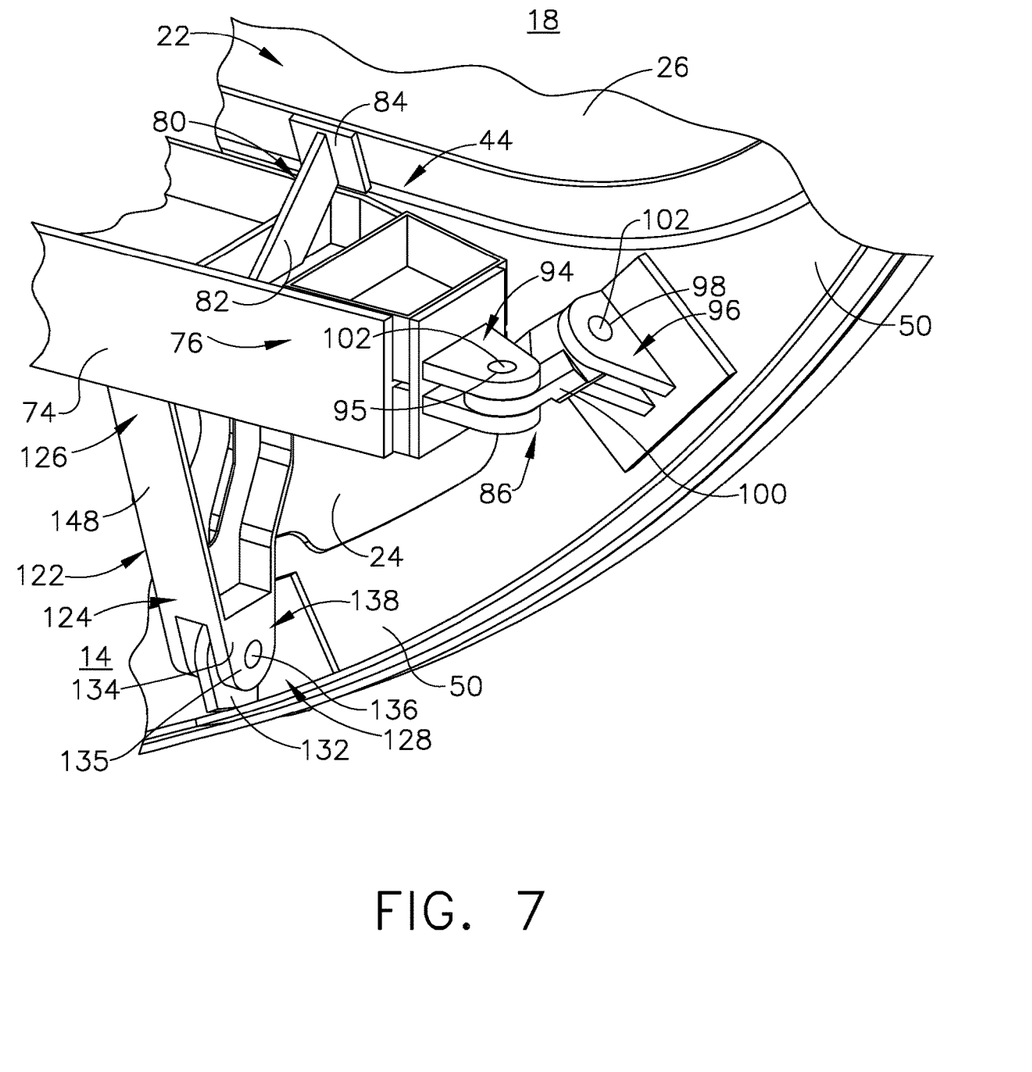
FIG. 7 is partial cut away enlarged perspective view of aft side of bulkhead wall assembly of FIG. 2.

In referring to FIGS. 6 and 7, pressure bulkhead 16 further includes primary support beam 74 positioned on aft side 14 of wall assembly 22. In this embodiment, beam 74 extends along direction 46 of splice joint 44, as seen in FIG. 2. First end portion 76 and an opposing second end portion 78 of primary support beam 74 are each secured to chord structure 50. The interconnection of second end portion 78 to chord structure 50 and the transferring of loads received by primary beam support 74 from wall assembly 22 to forward side 18 of bulkhead 16 is the same as that which will be described for first end portion 76. Thus the description herein of the connection of first end portion 76 of primary support beam 74 will provide the description of the connection of and performance of opposing second end portion 78 of primary support beam 74.

Primary support beam 74 extends along the direction 46, as seen in FIG. 3, of splice joint 44, as mentioned above. During pressurization within aircraft 10, support gusset 80, as seen in FIGS. 4 and 7, receives loading from wall assembly 22 along splice joint 44 and transfers the loading to primary beam support 74. Gusset 80 includes first end portion 82 and opposing second end portion 84. First end portion 82 of gusset 80 is secured to primary support beam 74 by way of bolts, rivets, welding or other securement. Gusset 80 extends from first end portion 82 which is connected to primary support beam 74 to opposing second end portion 84 which is connected to wall assembly 22. Second end portion 84 is secured to wall assembly 22 similarly by way of bolts, rivets, welding or other securement.

Figure 8:
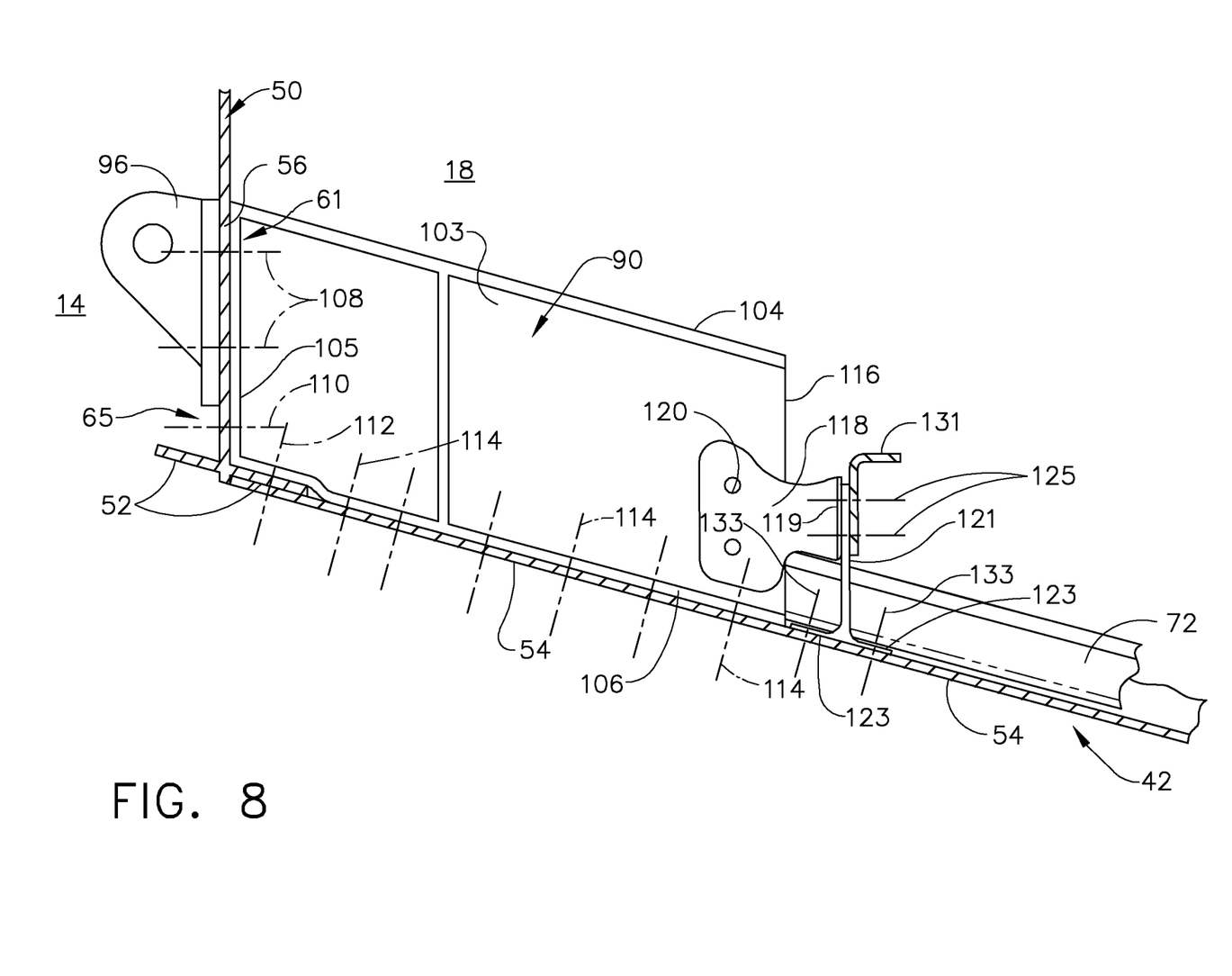
FIG. 8 is a cross section view a seen along line 8-8 in FIG. 3 viewing an intercostal bracket extending on forward side of wall assembly associated with a primary support beam.

First end portion 76 of primary support beam 74 is secured to chord member 50 with first bracket assembly 86, as seen in FIGS. 6 and 7. First bracket assembly 86 is positioned on aft side 14 of chord member 50 and opposing second end portion 78 of primary support beam 74 is secured to chord member 50 with second bracket assembly 88 also positioned on aft side 14 of chord member 50. First bracket assembly 86 is further secured to first intercostal bracket member 90, as seen in FIGS. 3, 6 and 8. First intercostal bracket member 90 is positioned on an opposing forward side 18 of chord structure 50, wherein first intercostal bracket member 90 extends in a direction away from opposing forward side 18 of chord member 50. Second bracket assembly 88 is further secured to a second intercostal bracket member 92, as seen in FIG. 3. Second intercostal bracket member 92 is also positioned on an opposing forward side 18 of chord structure 50, wherein second intercostal bracket member 92 also extends in a direction away from opposing forward side 18 of chord structure 50.

First bracket assembly 86, as seen in FIG. 7, is constructed the same, in this embodiment, as second bracket assembly 88 (not fully shown), as seen in FIG. 6. First bracket assembly 86 includes first lug assembly 94 which defines spaced apart pin openings 95. First lug assembly 94 is secured to primary beam support 74 by way of rivets, bolts, welding or other securement. Second lug assembly 96 which similarly defines spaced apart pin openings 98 is secured to chord 50 as will described below. First bracket assembly 86 further includes connector plate 100, in this embodiment, plate 100 is a bi-planar plate and each opposing end portion of plate 100 defines a pin opening (not shown). With each pin opening of connector plate 100 aligned with spaced apart pin openings 95 and 98 of first and second lug assemblies 94, 96, respectively, pins 102 are inserted through these aligned openings providing a connection between first and second lug assemblies 94 and 96 and connecting primary beam support 74 with first bracket assembly 86 to chord structure 50.

First intercostal bracket member 90, as seen in FIG. 8 and second intercostal bracket member 92, as seen in FIG. 3, are secured to first bracket assembly 86 and second bracket assembly 88, respectively. In turn, first and second intercostal bracket assemblies 90 and 92 are secured to skin 54 of the aircraft 10. The connection of first and second bracket assemblies 86 and 88 being secured to first and second intercostal bracket members 90 and 92, respectively are the same in this embodiment. Similarly, the connection of first and second intercostal 90 and 92 to skin 54 of aircraft 10 are also accomplished in the same way in this embodiment.

In referring to FIG. 8, first lug assembly 96 is shown of first bracket assembly 86 positioned on aft side 14 of chord structure 50 with stem 56 of chord structure 50 positioned between first lug assembly 96 and first intercostal bracket 90. In FIG. 8, first intercostal bracket 90 is shown with web 103 and upper and lower flanges 104 and 106, respectively, as seen in FIG. 3. Also, back plate 105 of first intercostal 90 extends along web 103. In upper portion 61 of stem 56 of chord structure 50, schematically shown rivets 108 secure web 103, back plate 105 of first intercostal bracket 90, stem 56 and first lug assembly 96 of first bracket assembly 86 together. Other forms of securement such as bolting, welding and the like can be employed as is the case for other rivet securements employed herein.

In lower portion 65 of stem 56 of chord structure 50, rivets 110, schematically shown, secure web 103 and back plate 105 of first intercostal bracket 90 to stem 56. Cross member 52 on forward side 18 of chord structure 50 is positioned between web 103 and lower flange 106 of first intercostal bracket 90 on the one side and skin 54 of aircraft 10, on the other side. Cross member 52 is secured to web 103, lower flange 106 and skin 54 with schematically shown rivets 112. As first intercostal bracket 90 extends away from stem 56 of chord structure 50 on forward side 18 of chord structure 50, rivets 114 schematically shown secure web 103 and lower flange 106 of first intercostal bracket 90 to skin 54.

At distal end 116 of first intercostal bracket 90, clip 118 is secured to web 103 of first intercostal bracket 90 with rivets 120. Distal end 119 of clip 118 abuts skin clip 121 which extends to skin 54. Cross member 123 of skin clip 121 overlies skin 54 in this embodiment. In this example, skin clip 121 is secured to clip 118 and to rib 131 with rivets 125 or by way of other securement as mentioned herein for securement of members. Cross member 123 of skin clip 121 is riveted to skin 54 with rivets 133 schematically shown or by way of other securement as mentioned herein for securement of members. Stringer 72 is seen in this view positioned behind and spaced apart from first intercostal member 90, in this example. With clip 118 securement to skin 54, this provides anchoring of first intercostal member 90 so as to resist induced moment exerted to first intercostal member 90 from load exertion from first lug assembly 96 of first bracket member 86 associated with primary beam support 74.

Thus, a load exerted onto wall assembly 22 during pressurization is exerted onto primary beam support 74 through gussets 80. Primary beam support 74 transfers, in part, this load to first and second bracket assemblies 86 and 88. With first and second bracket assemblies 86 and 88 connected to chord structure 50 wherein, for example, first lug assembly 96, as seen in FIG. 8 connects to stem 56 of chord structure 50 and to first intercostal bracket 90. First intercostal bracket 90 connects to and anchors with skin 54 of fuselage 42 of aircraft 10. This is similarly the case for second bracket assembly 88 connecting to chord structure 50 and second intercostal bracket 92 wherein second intercostal bracket 92 connects to and anchors with skin 54.

Further support to primary beam support 74 is also provided with at least one secondary support beam 122, as seen in FIGS. 6 and 7. In this embodiment, four secondary beam supports 122 are positioned spaced apart along a length of primary beam support 74 and each are secured to primary beam support 74 and to chord structure 50. Secondary beam support 122 includes first end portion 124 and opposing second end portion 126. First end portion 124 is connected to chord structure 50 with a first bracket assembly 128 positioned on an aft side 14 of the chord structure 50. Second opposing end portion 126 is connected to primary beam support 74 with a second bracket assembly 130 positioned on aft side 14 of wall assembly 22 and of chord structure 50.

As seen in FIG. 7, first end portion 124 of secondary support beam 122 is secured to chord structure 50 with first bracket assembly 128. First bracket assembly 128 includes first lug connector 132 which defines opening (not shown) and is secured to chord structure 50, as will be discussed below. First end portion 124 of secondary support beam 122 includes second lug connector 134 which defines opening 135. Pin 136 positioned through opening 135 opening of first lug connector 132 forms a first pin connection 138 between first end portion 124 of secondary support beam 122 and chord structure 50.

As seen in FIG. 6, second end portion 126 of secondary support beam 122 includes third lug connector 140 which defines opening 141 and primary beam support 74 includes fourth lug connector 142, which in this embodiment includes a hole (not shown) which extends through primary support beam 74. With opening 141 of third lug connector 140 aligned with opening of fourth lug connector 142, pin 144 is positioned to extend through opening 141 of third lug connector 142 and opening and fourth lug connector 142. With pin 144 thus positioned, a second pin connection 146 is formed between second end portion 126 of secondary support beam 122 and primary support beam 74.

Secondary support beam 122 further includes leg 148, as seen in FIGS. 6 and 7, which extends between first and second pin connections 138, 146 such that second pin connection 146 is positioned spaced apart further from first wall section 24 of wall assembly 22 than first pin connection 138 is spaced apart from chord structure 50, as seen in FIG. 6.

In referring to FIGS. 2, 3, 7 and 9, first bracket assembly 128 secures first end portion 124 of secondary support beam 122 to aft side 14 of chord structure 50. As will be discussed in more detail below, first bracket assembly 128 is further secured to third intercostal bracket 150 positioned on an opposing forward side 18 of chord structure 50. Third intercostal bracket 150 extends in a direction away from opposing forward side 18 of chord structure 50 and third intercostal bracket 150 is secured to skin 54 of fuselage 42 of aircraft 10.

Figure 9:
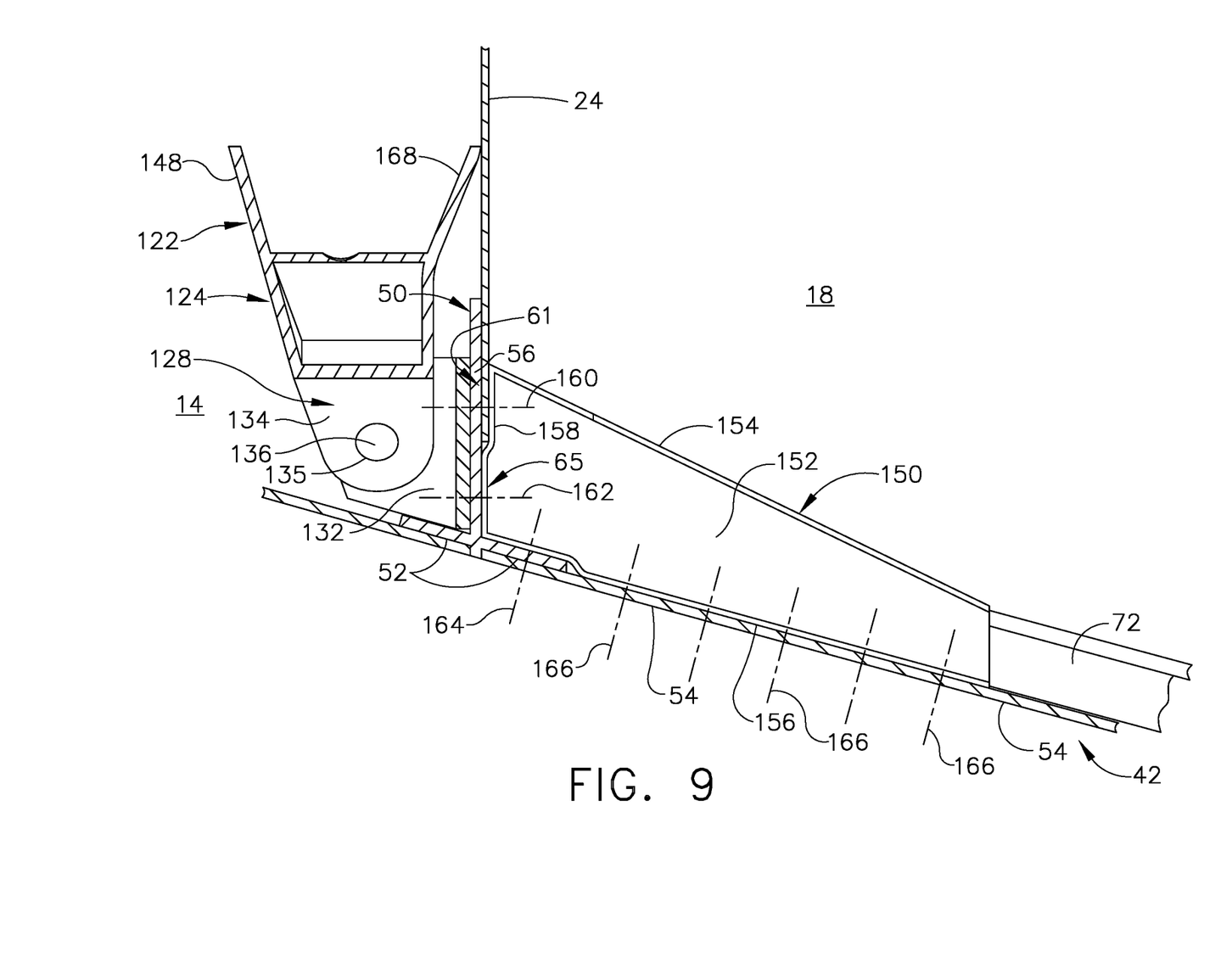
FIG. 9 is a cross section view as seen along line 9-9 in FIG. 3 viewing an intercostal bracket extending on forward side of wall assembly associated with a secondary support beam.

In referring to FIG. 9, first bracket assembly 128 is shown with first lug connector 132 of first bracket assembly 128 is positioned on aft side 14 of chord structure 50 with stem 56 of chord structure 50 positioned between first lug connector 132 and third intercostal bracket 150.

In FIG. 9, third intercostal bracket 150 is shown with web 152 and upper and lower flanges 154 and 156, respectively, as seen in FIG. 3. Also, back plate 158 of third intercostal bracket 150 extends along web 152. In upper portion 61 of stem 56 of chord structure 50, schematically shown rivets 160 secure web 152, back plate 105 of third intercostal bracket 150, first wall section 24, stem 56 and first lug connector 132 of first bracket assembly 128 together. Other forms of securement such as bolting, welding and the like can be employed as is the case for other rivet securements employed herein.

In lower portion 65 of stem 56 of chord structure 50, rivets 162, schematically shown, are used to secure web 152, back plate 158 of third intercostal bracket 150, stem 56 and first lug connector 132 of first bracket assembly 128 together. Cross member 52 on forward side 18 of chord structure 50 is positioned between web 152 and lower flange 156 of third intercostal bracket 150 on the one side and skin 54 of fuselage 42 of aircraft 10, on the other side. Cross member 52 is secured to web 152, lower flange 156 and skin 54 with rivets 164 schematically shown. As third intercostal bracket 150 extends away from stem 56 of chord structure 50 on forward side 18 of chord structure 50, rivets 166, schematically shown, secure web 152, lower flange 156 of third intercostal bracket 150 to skin 54 of fuselage 42.

Stringer 72 is seen in this view positioned behind and spaced apart from third intercostal bracket 150, in this example. Back wall member 168 of secondary support beam 122 extends from first bracket assembly 128 and abuts aft side 14 of first wall section 24. Back wall member 168 provides additional support for first wall section 24 during pressurization of forward side 18 within aircraft 10.

Thus, a load exerted onto wall assembly 22 during pressurization is exerted onto primary beam support 74 through gussets 80, as discussed earlier. Primary beam support 74 transfers, in part, this load to secondary support beam 122 through second bracket assembly 130 to first bracket assembly 128. First bracket assembly 128 is connected, as described above, to stem 56 of chord structure 50 and to third intercostal bracket 150, as seen in FIG. 9. Third intercostal bracket 150 in turn connects to and anchors with skin 54 of fuselage 42 of aircraft 10. This is similarly the load path for the other secondary beam supports 122 transference of load from primary beam support 74 to third intercostal bracket 150 and therefrom to anchor into skin 54 of fuselage 42.

A method for assembling a pressure bulkhead 16 includes the step of positioning first wall section 24 and second wall section 26 adjacent to one another. The method further includes the step of securing first wall section 24 to second wall section 26, wherein second wall section 26 comprises a curved shape 32 with convex portion 34 which extends further along length L of aircraft 10 in direction 36 toward an aft end 14 of aircraft 10 than first wall section 24. The securing of first wall section 24 to second wall section 26 forms a splice joint 44 between first and second wall sections 24, 26 and forms wall assembly 22.

The method further includes a step of positioning chord structure 50 around an outer perimeter 51 of wall assembly 22. Further included in the method is a step of positioning primary support beam 74 on aft side 14 of wall assembly 22 to extend in direction 46 along splice joint 44 as seen in FIG. 2. Also included is the step for securing a first end portion 76 of primary support beam 74 to chord structure 50 with first bracket assembly 86 positioned on aft side 14 of chord structure 50 and securing first bracket assembly 86 to first intercostal bracket member 90 positioned on an opposing forward side 18 of chord structure 50. First intercostal member 90 extends in a direction away from opposing forward side 18 of chord structure 50. The method also includes securing an opposing second end portion 78 of primary support beam 74 to chord structure 50 with second bracket assembly 88 positioned on aft side 14 of chord structure 50 and securing second bracket assembly 88 to second intercostal bracket member 92 positioned on an opposing forward side 18 of chord structure 50. The second intercostal bracket member 92 extends in a direction away from opposing forward side 18 of chord structure 50.

The method includes the step of securing each of the first and second intercostal bracket members 90 and 92 to skin 54 of aircraft 10. In addition, the method further includes securing first end portion 124 of secondary support beam 122 to chord structure 50 with first bracket assembly 128 positioned on aft side 14 of chord structure 50 forming first pin connection 138. Also included in the method is the step of securing second end portion 126 of secondary support beam 122 to primary beam support 74 with second bracket assembly 130 positioned on aft side 14 of chord structure 50 forming second pin connection 146. Secondary support beam 122 includes leg 148, as seen in FIG. 7, which extends between first and second pin connections 138, 146, such that second pin connection 146 is positioned spaced apart further from first wall section 24 of wall assembly 22 than first pin connection 138 is spaced apart from chord structure 50, as seen in FIG. 6.

This method for assembling a pressure bulkhead 16 further includes the steps of securing first bracket assembly 128, associated with secondary support beam 122 positioned on aft side 14 of chord structure 50 to third intercostal bracket 150 which is positioned on an opposing forward side 18 of chord structure 50, as seen in FIGS. 6 and 9. Third intercostal bracket 150 extends in a direction away from opposing forward side 18 of chord structure 50. In addition, this method includes securing third intercostal bracket 150 to skin 54 of aircraft 10, as seen in FIG. 9.

While various embodiments have been described above, this disclosure is not intended to be limited thereto. Variations can be made to the disclosed embodiments that are still within the scope of the appended claims.

What is claimed:

1. A pressure bulkhead for an aircraft, comprises:
a wall assembly, comprising:
a first wall section which extends in a direction non-parallel to a longitudinal length of the aircraft;
a second wall section secured to the first wall section, wherein:
the second wall section comprises a curved shape wherein a convex portion of the curved shape of the second wall section extends further along the longitudinal length of the aircraft in a direction toward an aft end of the aircraft than the first wall section;
a chord structure which extends about a perimeter of the wall assembly; and
a primary support beam positioned on an aft side of the wall assembly, wherein:
a first end portion and an opposing second end portion of the primary support beam are each secured to the chord structure; and
the primary support beam extends along the wall assembly nonparallel to the direction of the longitudinal length of the aircraft.

2. The pressure bulkhead of claim 1, the curved shape of the second wall section comprises a domed-shape.

3. The pressurized bulkhead of claim 1, wherein with the second wall section extends in a direction away from the first wall section.

4. The pressure bulkhead of claim 1, wherein the first wall section and the second wall section are secured together along a splice joint which extends across the wall assembly in the direction nonparallel to the longitudinal length of the aircraft.

5. The pressure bulkhead of claim 1, wherein the chord structure is secured to the wall assembly and to a rib and a skin of the aircraft.

6. The pressure bulkhead of claim 4, wherein
the primary support beam extends along the direction of the splice joint.

7. The pressure bulkhead of claim 6, further includes a support gusset comprising a first end portion and an opposing second end portion, wherein:
the first end portion is secured to the primary support beam and extends from the primary support beam to the opposing second end portion in a direction, and
the opposing second end portion is secured to the wall assembly, wherein the support gusset transmits a load force to the primary support beam with the wall assembly pressurized within the aircraft.

8. The pressure bulkhead of claim 6, wherein the first end portion of the primary support beam is secured to the chord structure with a first bracket assembly positioned on an aft side of the chord structure and the opposing second end portion of the primary support beam is secured to the chord structure with a second bracket assembly positioned on the aft side of the chord structure, wherein:

the first bracket assembly is further secured to a first intercostal bracket member positioned on an opposing forward side of the chord structure, wherein the first intercostal bracket member extends in a direction away from the opposing forward side of the chord structure; and
the second bracket assembly is further secured to a second intercostal bracket member positioned on an opposing forward side of the chord structure, wherein the second intercostal bracket member extends in a direction away from the opposing forward side of the chord structure.

9. The pressure bulkhead of claim 8, wherein the first intercostal bracket member and the second intercostal bracket member are each secured to a skin of the aircraft.

10. A pressure bulkhead for an aircraft, comprises:
a wall assembly, comprising:
a first wall section which extends in a direction non-parallel to a longitudinal length of the aircraft;
a second wall section secured to the first wall section wherein the second wall section comprises a curved shape wherein a convex portion of the curved shape of the second wall section extends further along the longitudinal length of the aircraft in a direction along an aft end of the aircraft than the first wall section;
a chord structure which extends about a perimeter of the wall assembly, wherein the first wall section and the second wall section are secured together along a splice joint which extends across the wall assembly in a direction nonparallel to the length of the aircraft;
a primary support beam positioned on an aft side of the wall assembly, wherein:
a first end portion and an opposing second end portion of the primary support beam are each secured to the chord structure; and
the primary support beam extends along the direction of the splice joint; and
at least one secondary support beam comprising:
a first end portion; and
an opposing second end portion, wherein:
the first end portion is connected to the chord structure with a first bracket assembly positioned on an aft side of the chord structure; and
the second opposing end portion is connected to the primary support beam with a second bracket assembly positioned on the aft side of the chord structure.

11. The pressure bulkhead of claim 10, wherein the first bracket assembly secures the first end portion of the at least one secondary support beam to the chord structure, wherein the first bracket assembly comprises a first lug connector secured to the chord structure and the first end portion of the at least one secondary support beam comprises a second lug connector such that a pin positioned through the first lug connector and the second lug connector forms a first pin connection between the at least one secondary support beam and the chord structure.

12. The pressure bulkhead of claim 11, wherein the opposing second end portion of the at least one secondary support beam comprises a third lug connector and the primary beam support comprises a fourth lug connector such that a pin positioned through the third lug connector and the fourth lug connector forms a second pin connection between the at least one secondary support beam and the primary support beam.

13. The pressure bulkhead of claim 12 wherein the at least one secondary support beam further includes a leg which extends between the first and second pin connections such that the second pin connection is positioned spaced apart further from the first wall section of the wall assembly than the first pin connection is spaced apart from the chord structure.

14. The pressure bulkhead of claim 12, with the first bracket assembly positioned on the aft side of the chord structure, the first bracket assembly is further secured to a third intercostal bracket member positioned on an opposing forward side of the chord structure and extends in a direction away from the opposing forward side of the chord structure.

15. The pressure bulkhead of claim 14, wherein the third intercostal bracket member is secured to the skin of the aircraft.

16. A method for assembling a pressurize bulkhead, comprising the steps of:
positioning a first wall section and a second wall section adjacent to one another forming a wall assembly; wherein:
the second wall section comprises a curved shape wherein a convex portion of the curved shape of the second wall section extends further along a longitudinal length of an aircraft in a direction toward an aft end of the aircraft than the first wall section;
a chord structure extends about a perimeter of the wall assembly; and
a primary support beam is positioned on an aft side of the wall assembly of the aircraft, wherein:
a first end portion and an opposing second end portion of the primary support beam are each secured to the chord structure; and
the primary support beam extends along the wall assembly in a direction nonparallel to the longitudinal length of the aircraft.

17. The method for assembling a pressurized bulkhead of claim 16, wherein the step of positioning further includes securing the first and second wall sections together along a splice joint of the first and second wall sections.

18. The method for assembling a pressure bulkhead of claim 17, further including the steps of:
positioning the primary support beam on an aft side of the wall assembly to extend in a direction along the splice joint;
securing the first end portion of the primary support beam to the chord structure with a first bracket assembly positioned on the aft side of the chord structure and securing the first bracket assembly to a first intercostal bracket member positioned on an opposing forward side of the chord structure wherein the first intercostal bracket member extends in a direction away from the opposing forward side of the chord structure;
securing the opposing second end portion of the primary support beam to the chord structure with a second bracket assembly positioned on the aft side of the chord structure and securing the second bracket assembly to a second intercostal bracket member positioned on an opposing forward side of the chord structure wherein the second intercostal bracket member extends in a direction away from the opposing forward side of the chord structure; and
securing each of the first and second intercostal bracket members to a skin of the aircraft.

19. The method for assembling a pressure bulkhead of claim 18, further including the steps of:
securing a first end portion of at least one secondary support beam to the chord structure with a first bracket assembly positioned on the aft side of the chord structure forming a first pin connection; and
securing a second end portion of the at least one secondary support beam to the primary support beam with a second bracket assembly positioned on the aft side of the chord structure forming a second pin connection, wherein the at least one secondary support beam comprises a leg which extends between the first and second pin connections such that the second pin connection is positioned spaced apart further from the first wall section of the wall assembly than the first pin connection is spaced apart from the chord structure.

20. The method for assembling a pressure bulkhead of claim 19, further including the steps of:
securing the first bracket assembly associated with the at least one secondary support beam positioned on the aft side of the chord structure to a third intercostal bracket member positioned on an opposing forward side of chord structure which extends in a direction away from the opposing forward side of the chord structure; and
securing the third intercostal bracket member to the skin of the aircraft.

* * * * *